US008880884B2

(12) United States Patent
Seibert et al.

(10) Patent No.: US 8,880,884 B2
(45) Date of Patent: *Nov. 4, 2014

(54) SYSTEM AND METHOD FOR ENABLING SEAMLESS TRANSFER OF A SECURE SESSION

(71) Applicant: Dell Products, LP, Round Rock, TX (US)

(72) Inventors: Philip M. Seibert, Round Rock, TX (US); Abu Sanaullah, Austin, TX (US); Charles D. Robison, Jr., Round Rock, TX (US); Claude L. Cox, Austin, TX (US); Jason A. Shepherd, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/941,818

(22) Filed: Jul. 15, 2013

(65) Prior Publication Data

US 2013/0305350 A1  Nov. 14, 2013

Related U.S. Application Data

(63) Continuation of application No. 13/350,998, filed on Jan. 16, 2012, now Pat. No. 8,527,763.

(51) Int. Cl.
*H04L 9/00* (2006.01)
*H04L 9/32* (2006.01)
*H04L 29/06* (2006.01)
*G06F 21/44* (2013.01)

(52) U.S. Cl.
CPC ............. *G06F 21/44* (2013.01); *H04L 2209/80* (2013.01); *H04L 9/3263* (2013.01); *H04L 63/08* (2013.01)

USPC ............................ 713/168; 713/169; 713/171

(58) Field of Classification Search
CPC ....... H04L 9/08; H04L 63/08; H04L 63/0869; H04L 63/10; H04L 63/06; H04L 63/061; H04L 63/062; H04L 63/065; G06F 21/44
USPC ................. 713/150–152, 161, 163, 168–173; 726/2–4, 17; 380/277–278
See application file for complete search history.

(56) References Cited

U.S. PATENT DOCUMENTS

| 7,028,335 | B1 | 4/2006 | Borella et al. |
| 7,818,578 | B2 | 10/2010 | Lewis et al. |
| 7,974,606 | B2 | 7/2011 | Lo et al. |
| 7,992,197 | B2 * | 8/2011 | Naaman et al. .................. 726/8 |

(Continued)

*Primary Examiner* — Hosuk Song
(74) *Attorney, Agent, or Firm* — Larson Newman, LLP

(57) ABSTRACT

An information handling system includes a memory and a processor to execute instructions stored in the memory, which causes the processor to at least: send identification information to a second information handling system in response to an identification request broadcast from the second information handling system via a short-range communication; receive first authentication information for a local application and a remote service from the second information handling system; receive a copy of the local application; authenticate a user for the copy of the local application and for the remote service prior to the user logging on to the information handling system; receive second authentication information from the user to access the information handling system; authenticate the user to the information handling system; and automatically initiate a secure session between the copy of the local application and the remote service when the user is authenticated to the information handling system.

20 Claims, 5 Drawing Sheets

(56) References Cited

U.S. PATENT DOCUMENTS

| | | | |
|---|---|---|---|
| 8,527,763 B2 * | 9/2013 | Seibert et al. | 713/168 |
| 8,533,803 B2 * | 9/2013 | Cha et al. | 726/8 |
| 8,613,070 B1 * | 12/2013 | Borzycki et al. | 726/8 |
| 8,646,028 B2 * | 2/2014 | McKenzie et al. | 726/1 |
| 2005/0091539 A1 | 4/2005 | Wang et al. | |
| 2008/0320560 A1 | 12/2008 | Casey et al. | |
| 2011/0063994 A1 | 3/2011 | Nix et al. | |
| 2012/0290694 A9 | 11/2012 | Marl et al. | |

* cited by examiner

SYSTEM AND METHOD FOR ENABLING SEAMLESS TRANSFER OF A SECURE SESSION

CROSS REFERENCE TO RELATED APPLICATIONS

This application is a continuation of U.S. patent application Ser. No. 13/350,998, entitled "System and Method for Enabling Seamless Transfer of a Secure Session," filed on Jan. 16, 2012, the disclosure of which is hereby expressly incorporated by reference in its entirety.

FIELD OF THE DISCLOSURE

This disclosure generally relates to information handling systems, and more particularly relates to a system and method for enabling seamless transfer of a secure session.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

A user may have multiple devices, such as a laptop computer, a personal computer, a cellular telephone, or a tablet that can interface with a remote secure service. The user may have to enter authentication information from one of the devices to access the remote secure service, such as an Internet application for banking, a remote application, or the like. When the user wants to change the device that is used to access the remote secure service, the user can enter the authentication information for the remote secure service using the new device.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
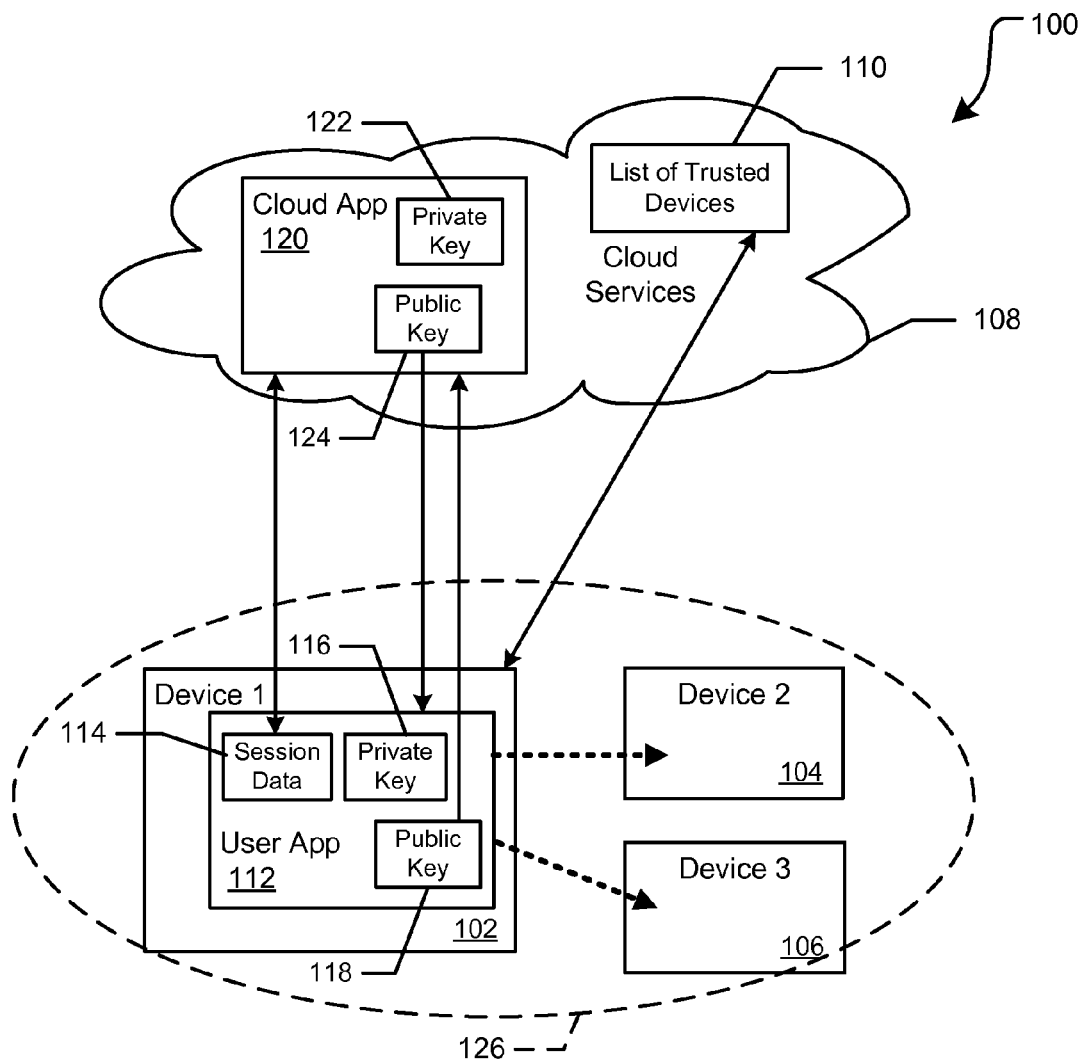
FIG. 1 is a block diagram of a secure session network.

FIG. 1 illustrates a block diagram of a secure session network 100 for an information handling system. For purposes of this disclosure, the information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

The secure session network 100 includes devices 102, 104, and 106, cloud services 108, and a list of trusted devices 110. The device 102 can execute a user application 112 that includes session data 114, a private key 116, and a public key 118. The device 102 can utilize the user application 112 to communicate with a cloud application 120 that includes a private key 122 and a public key 124. The device 102 can also be in communication with the list of trusted devices 110, and with the devices 104 and 106 via a short-range communication 126. The devices 102, 104, and 104 can be any type of information handling system such as a server, a personal computer, a laptop computer, a cellular telephone, a tablet, or the like.

A user can enter authentication information into the device 102, which in turn can authenticate the user and log the user into the device based on the authentication information. The user can select the user application 112, which can be associated with the cloud application or service 120. The user can then enter authentication information for the user application 112 and the cloud application 120. When the user has been authenticated to the user application 112 and the cloud application, the device 102 can determine whether any other devices are within short-range communication 126, such as devices 104 and 106. The device 102 can then receive identification information for the devices 104 and 106, such as the service set identification (SSID), Bluetooth identification number, or the like. The device 102 can then communicate with the cloud services 108 to retrieve the list of trusted devices 110.

When the list of trusted devices 110 has been received, the device 102 can compare the identification information for the devices 104 and 106 with the information in the list of trusted devices to verify that the devices are trusted devices for the user. The device 102 can identify the devices 104 and 106 as nearby destination devices for receiving the authentication information for the user application 112 and the cloud application 120. The device 102 can set up a secure connection with the devices 104 and 106 and can transfer the authentication information for the user application 112 and the cloud application 120 to each of the devices. The device 102 can also send a copy of the user application 112 including the session data 114, the private key 116, and the public key 118 to each of the devices 104 and 106 via the secure connection. Each of the devices 104 and 106 can then use the authentication information to pre-authenticate the device with the user application 112 and the cloud application 120. In an embodiment, the device 104 and 106 can perform the pre-authentication prior to the user logging onto the devices.

When the user has been authenticated to the user application 112 and the cloud application 120 via the device 102, the user application and the cloud application can exchange public keys 118 and 124. The user can then start a secure session between the user application 112 and the cloud application 120, via the transmitting application encrypting information to be transferred using the public key 118 or 124 of the other application and the receiving application decrypting the information using its own private key 116 or 122. The user application 112 can store the current state of the secure session with the cloud application 120 within the session data 114. During the secure session, the device 102 can send a copy of the entire user application 112 including the session data 114, the private key 116, the public key 118, and the public key 124 received from the cloud application 120 to the devices 104 and 106. In an embodiment, the device 102 can continually sends updates of the copy of the user application 112 to the devices 104 and 106 at predefined intervals, which can be set by the user application, the user, or the like.

If the user needs to step away from the device 102 but would like to continue working in the current secure session, the user can discontinue use of and secure the device, pick up either the device 104 or the device 106, and walk away from the short-range communication 126. In different embodiments, the device 102 can be secured by the user logging out of the device, locking the device, or the like. The user can then enter user authentication information to log onto the device 104. When the device 104 verifies the user authentication information entered by the user, the device automatically communicates with the cloud application 120 via the secure session that can be pre-authenticated. The device 104 can pre-authenticate the secure session based on the copy of the user application 112 that can be stored as user application 212 on the device, and based on the authentication information for the user application and the cloud application.

Figure 2:
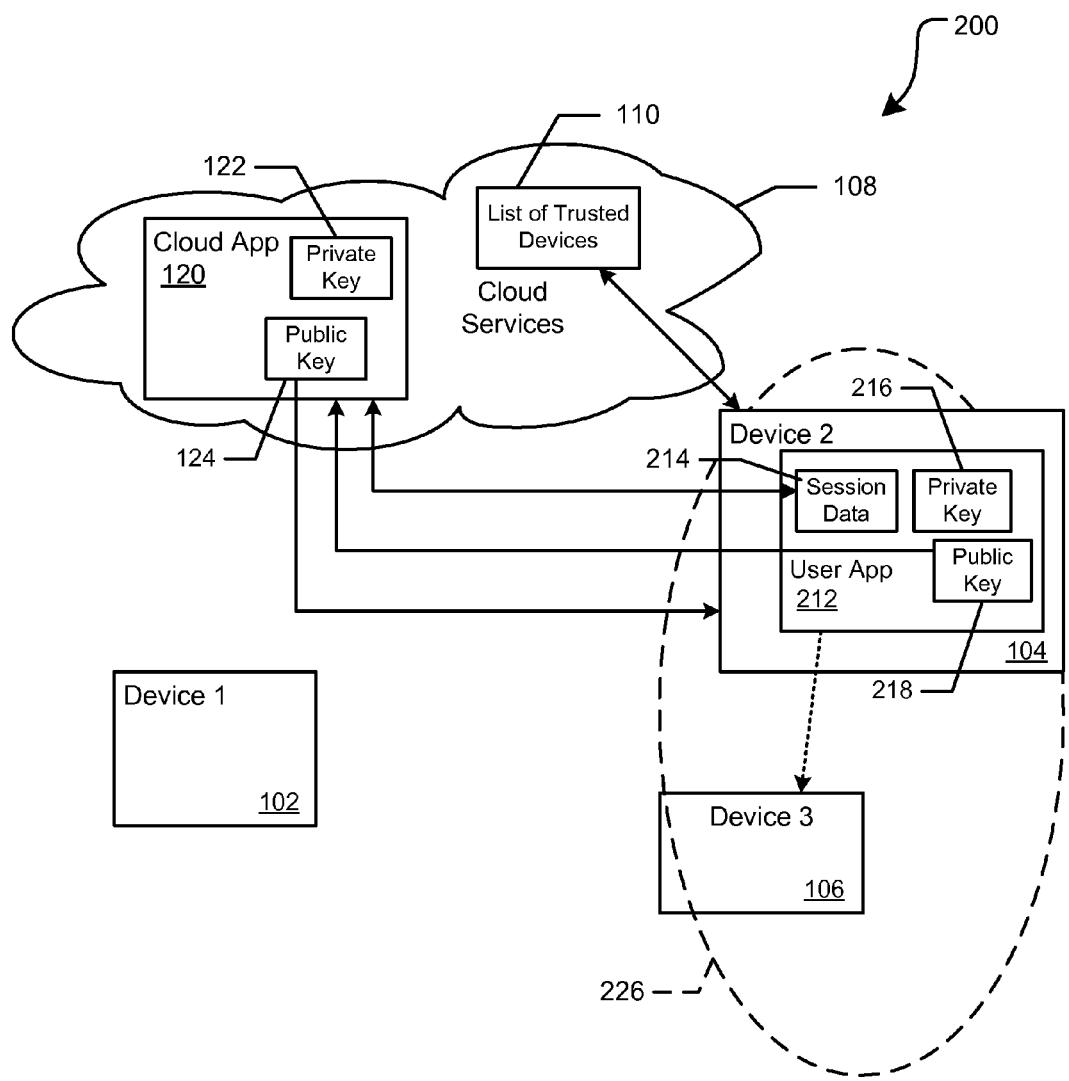
FIG. 2 is a block diagram of another embodiment of the secure session network.

FIG. 2 shows a secure session network 200 including the devices 102, 104, and 106, the cloud services 108, and the list of trusted devices 110. The device 102 can execute the user application 212 that includes session data 214, a private key 216, and a public key 218. In an embodiment, the user application 212 can be the copy of the user application 112, and the private key 216 and the public key 218 can be exact copies of the private key 116 and the public key 118 within user application 112. The device 104 can utilize the user application 212 to communicate with the cloud application 120 that includes the private key 122 and the public key 124. The device 102 can also be in communication with the list of trusted devices 110, and with the device 106 via a short-range communication 226.

The device 104 can start the secure session at the point the user stopped on device 102 based on the session data 114 received from the device 102 and stored as session data 214. The device can then determine whether any other device is within short-range communication 226, such as device 106. The device 104 can receive identification information for the device 106. The device 104 can then communicate with the cloud services 108 to retrieve the list of trusted devices 110.

When the list of trusted devices 110 has been received, the device 104 can compare the identification information for the device 106 with the information in the list of trusted devices to verify that the device is a trusted device for the user. The device 104 can identify the device 106 as nearby destination device for receiving the authentication information for the user application 212 and the cloud application 120. The device 104 can set up a secure connection with the device 106 and can transfer the authentication information for the user application 212 and the cloud application 120 to the device 106. The device 104 can also send a copy of the user application 212 including the session data 214, the private key 216, and the public key 218 to the device 106. The device 106 can then use the authentication information to pre-authenticate the device with the user application 212 and the cloud application 120.

The device 104 can encrypt information to be transferred to the cloud application 120 using the public key 124 and can decrypt the information using its own private key 216. The user application 212 can store the current state of the secure session with the cloud application 120 within the session data 214. During the secure session, the device 104 can update the device 106 by sending a copy of the entire user application 212 including the session data 214, the private key 216, the public key 218, and the public key 124 received from the cloud application 120. Thus, if the user switches to device 106, the secure session can be seamlessly transferred to the device 106 when the device 106 is pre-authenticated and based on the updates to the user application 212 received from the device 104. However, the user application 112 on device 102 may no longer have the updates to seamlessly transfer the secure session from the device 104 based on the device 102 not being located proximate to the device 104, such as when the device 102 is outside the range of the short-range communication 226.

Figure 3:
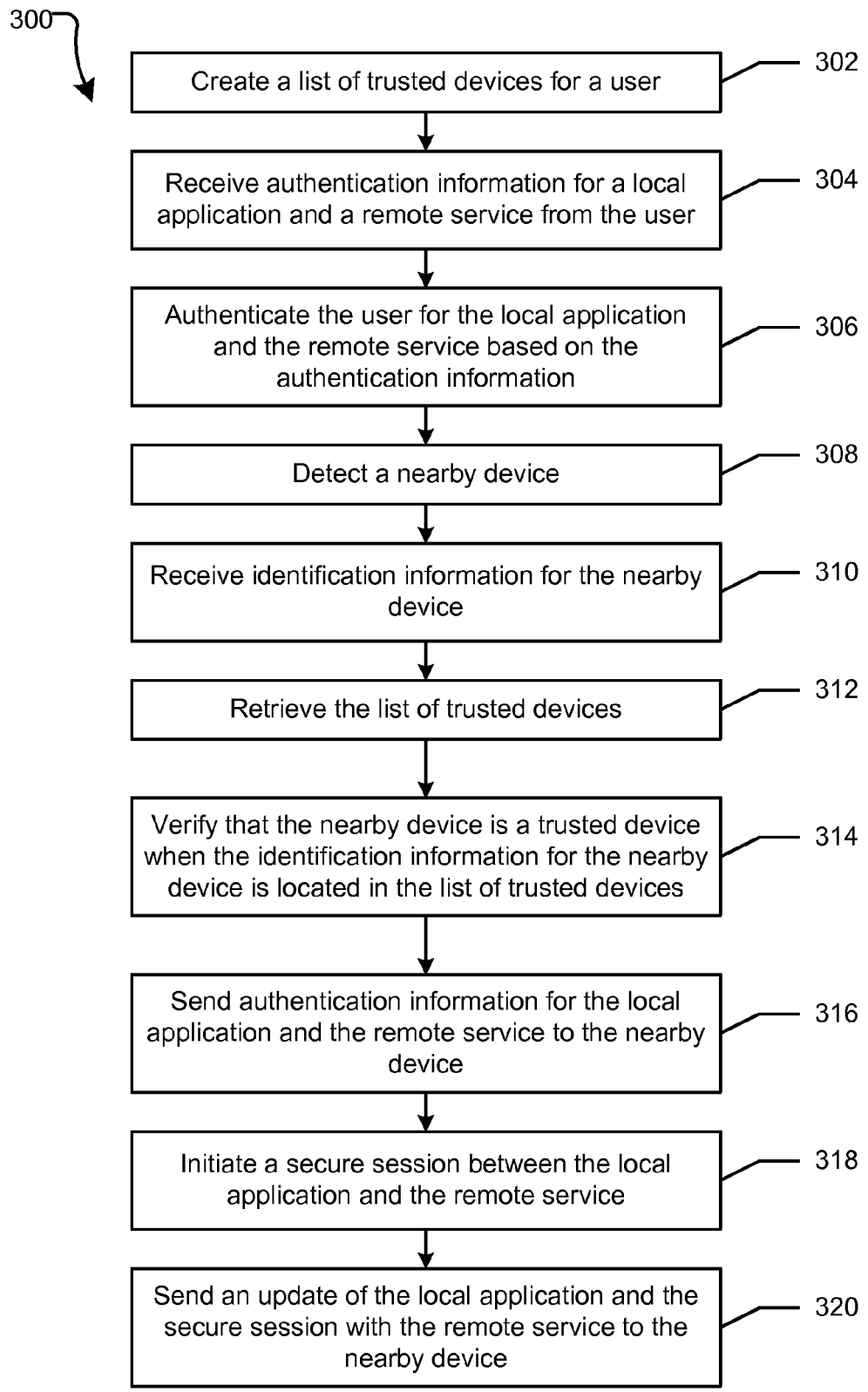
FIG. 3 is a flow diagram of a method for transferring a secure session from one device to another device.

FIG. 3 shows a flow diagram of a method 300 for transferring a secure session from a device to a nearby device. At block 302, a list of trusted devices for a user is created. Authentication information for a local application and a remote service are received by the device from the user at block 304. At block 306, the user is authenticated by the device for the local application and for the remote service based on the authentication information. The nearby device is detected by the device at block 308. In an embodiment, the nearby device can be within a short-range communication of the device, such as blue tooth communication, a near field communication, or the like.

At block 310, identification information for the nearby device is received at the device. The list of trusted devices is received at block 312. In an embodiment, the list of trusted devices can be stored remotely from the device in a cloud of services. At block 314, the nearby device is verified as a trusted device when the identification information for the nearby device is located in the list of trusted devices. The authentication information for the local application and the remote service are sent to the nearby device at block 316. The authentication information for the local application and the remote service can be used by the nearby device to pre-authenticate the nearby device with the local application and the remote service prior to the user accessing the nearby device.

At block 318, a secure session between the local application and the remote service is initiated at the device. An update to the local application and the secure session with the remote service is sent to the nearby device at block 320. The update can include session data from the secure session, the keys used to encrypt and decrypt the information sent during the secure session, or the like. In an embodiment, the keys can be a private key and a public key associated with the local application, and a public key received from the remote service.

Figure 4:
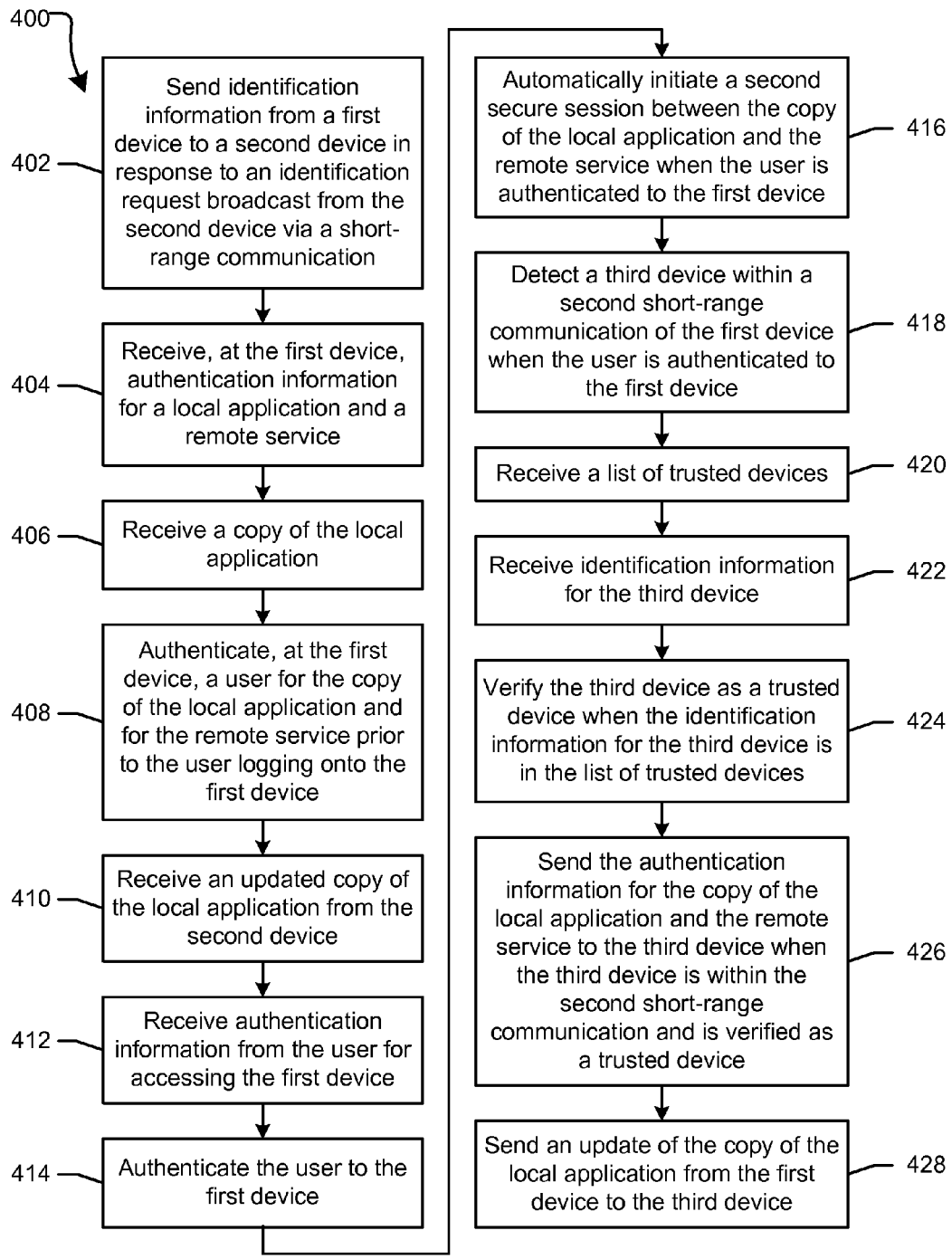
FIG. 4 is a flow diagram of a method for pre-authenticating a device to a remote secure service.

FIG. 4 shows a method 400 for pre-authenticating a first device to a remote secure service. At block 402, identification information is sent from the first device to a second device in response to an identification request broadcast from the second device via a short-range communication. The identification request can be broadcast from the second device when a user is authenticated for a local application on the second device and a remote service. The authentication information for the local application and the remote service are received at block 404. At block 406, a copy of the local application is received. In an embodiment, the copy of the local application can include session data from a first secure session between the local application and the remote service, and keys used to encrypt and decrypt information sent during the secure session. The keys can be a private key and a public key associated with the local application, a public key received from the remote service, or the like.

At block 408, a user is authenticated, at the first device, for the copy of the local application and for the remote service prior to the user logging on to the first device. An updated copy of the local application is received from the second device at block 410. At block 412, authentication information is received from the user for accessing the first device. The user is authenticated to the first device at block 414. At block 416, a second secure session between the copy of the local application and the remote service is automatically initiated when the user is authenticated to the first device. In an embodiment, the second secure session is initiated at a point ended by the user on the second device based on the session data in the updated copy of the local application.

At block 418, a third device is detected with a second short-range communication of the first device when the user is authenticated to the first device. A list of trusted devices is received at block 420. At block 422, identification information for the third device is received. The third device is verified as a trusted device when the identification information for the third device is in the list of trusted devices at block 424. At block 426, the authentication information for the copy of the local application and the remote service to the third device is sent to the third device when the third device is within range of the second short-range communication and is verified as a trusted device. An update of the copy of the local application is sent from the first device to the third device at block 428.

Figure 5:
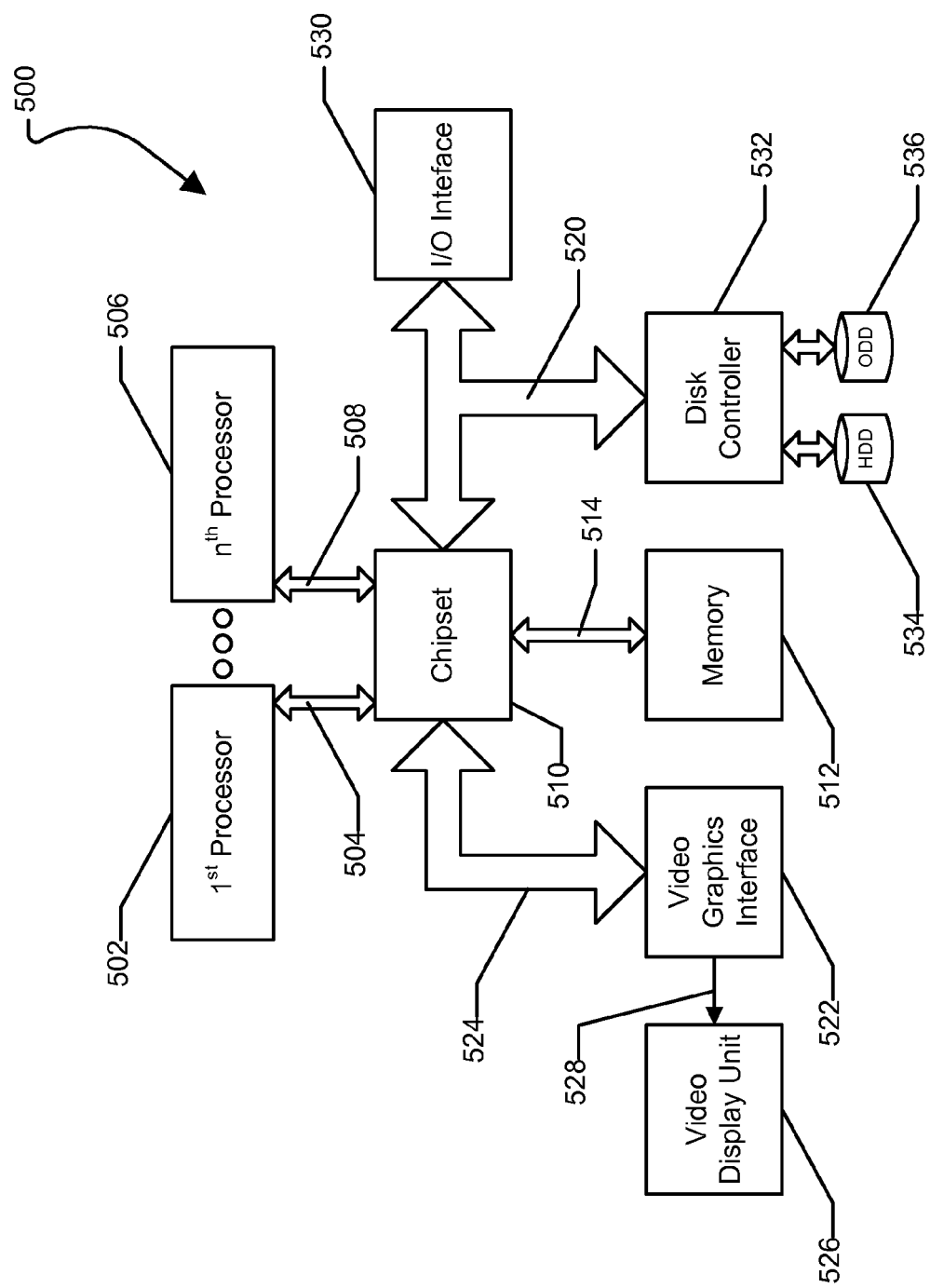
FIG. 5 is a block diagram of a general information handling system.

As shown in FIG. 5, the information handling system 500 can include a first physical processor 502 coupled to a first host bus 504 and can further include additional processors generally designated as $n^{th}$ physical processor 506 coupled to a second host bus 508. The first physical processor 502 can be coupled to a chipset 510 via the first host bus 504. Further, the $n^{th}$ physical processor 506 can be coupled to the chipset 510 via the second host bus 508. The chipset 510 can support multiple processors and can allow for simultaneous processing of multiple processors and support the exchange of information within information handling system 500 during multiple processing operations.

According to one aspect, the chipset 510 can be referred to as a memory hub or a memory controller. For example, the chipset 510 can include an Accelerated Hub Architecture (AHA) that uses a dedicated bus to transfer data between first physical processor 502 and the $n^{th}$ physical processor 506. For example, the chipset 510, including an AHA enabled-chipset, can include a memory controller hub and an input/output (I/O) controller hub. As a memory controller hub, the chipset 510 can function to provide access to first physical processor 502 using first bus 504 and $n^{th}$ physical processor 506 using the second host bus 508. The chipset 510 can also provide a memory interface for accessing memory 512 using a memory bus 514. In a particular embodiment, the buses 504, 508, and 514 can be individual buses or part of the same bus. The chipset 510 can also provide bus control and can handle transfers between the buses 504, 508, and 514.

According to another aspect, the chipset 510 can be generally considered an application specific chipset that provides connectivity to various buses, and integrates other system functions. For example, the chipset 510 can be provided using an Intel® Hub Architecture (IHA) chipset that can also include two parts, a Graphics and AGP Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 510. The chipset 510 can also be packaged as an application specific integrated circuit (ASIC).

The information handling system 500 can also include a video graphics interface 522 that can be coupled to the chipset 510 using a third host bus 524. In one form, the video graphics interface 522 can be an Accelerated Graphics Port (AGP) interface to display content within a video display unit 526. Other graphics interfaces may also be used. The video graphics interface 522 can provide a video display output 528 to the video display unit 526. The video display unit 526 can include one or more types of video displays such as a flat panel display (FPD) or other type of display device.

The information handling system 500 can also include an I/O interface 530 that can be connected via an I/O bus 520 to the chipset 510. The I/O interface 530 and I/O bus 520 can include industry standard buses or proprietary buses and respective interfaces or controllers. For example, the I/O bus 520 can also include a Peripheral Component Interconnect (PCI) bus or a high speed PCI-Express bus. In one embodiment, a PCI bus can be operated at approximately 66 MHz and a PCI-Express bus can be operated at more than one speed, such as 2.5 GHz and 4 GHz. PCI buses and PCI-Express buses can be provided to comply with industry standards for connecting and communicating between various PCI-enabled hardware devices. Other buses can also be provided in association with, or independent of, the I/O bus 520 including, but not limited to, industry standard buses or proprietary buses, such as Industry Standard Architecture (ISA), Small Computer Serial Interface (SCSI), Inter-Integrated Circuit ($I^2C$), System Packet Interface (SPI), or Universal Serial buses (USBs).

In an alternate embodiment, the chipset 510 can be a chipset employing a Northbridge/Southbridge chipset configuration (not illustrated). For example, a Northbridge portion of the chipset 510 can communicate with the first physical processor 502 and can control interaction with the memory 512, the I/O bus 520 that can be operable as a PCI bus, and activities for the video graphics interface 522. The Northbridge portion can also communicate with the first physical processor 502 using first bus 504 and the second bus 508 coupled to the n$^{th}$ physical processor 506. The chipset 510 can also include a Southbridge portion (not illustrated) of the chipset 510 and can handle I/O functions of the chipset 510. The Southbridge portion can manage the basic forms of I/O such as Universal Serial Bus (USB), serial I/O, audio outputs, Integrated Drive Electronics (IDE), and ISA I/O for the information handling system 500.

The information handling system 500 can further include a disk controller 532 coupled to the I/O bus 520, and connecting one or more internal disk drives such as a hard disk drive (HDD) 534 and an optical disk drive (ODD) 536 such as a Read/Write Compact Disk (R/W CD), a Read/Write Digital Video Disk (R/W DVD), a Read/Write mini-Digital Video Disk (R/W mini-DVD), or other type of optical disk drive.

Although only a few exemplary embodiments have been described in detail in the exemplary embodiments without materially departing from the novel teachings and advantages of the embodiments of the present disclosure. For example, the methods described in the present disclosure can be stored as instructions in a computer readable medium to cause a processor, such as chipset 510, to perform the method. Additionally, the methods described in the present disclosure can be stored as instructions in a non-transitory computer readable medium, such as a hard disk drive, a solid state drive, a flash memory, and the like. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
    a memory; and
    a processor to execute instructions stored in the memory to cause the processor to at least:
        receive first authentication information for a local application and a remote service from a second information handling system via a short-range communication;
        receive a copy of the local application, wherein the copy of the local application includes session data from a secure session between the local application and the remote service, and keys used to encrypt and decrypt information sent during the secure session;
        authenticate a user for the copy of the local application and for the remote service prior to the user logging on to the information handling system based on the first authentication information;
        authenticate the user to the information handling system based on second authentication information received from the user; and
        automatically initiate a secure session between the copy of the local application and the remote service when the user is authenticated to the information handling system.

2. The information handling system of claim 1 wherein the instructions further cause the processor to:
    send identification information to the second information handling system in response to an identification request broadcast from the second information handling system via the short-range communication.

3. The information handling system of claim 1 wherein the instructions further cause the processor to:
    detect a third information handling system with a second short-range communication of the information handling system when the user is authenticated to the information handling system;
    receive a list of trusted devices;
    receive identification information for the third information handling system;
    verify that the third information handling system is a trusted device when the identification information for the third information handling system is in the list of trusted devices;
    send the authentication information for the copy of the local application and the remote service to the third information handling system when the third information handling system is within the second short-range communication and is verified as a trusted device; and
    send an updated of the copy of the local application to the third information handling system.

4. The information handling system of claim 1 wherein the keys are a private key and a public key associated with the local application, and a public key received from the remote service.

5. The information handling system of claim 1 wherein the secure session is initiated at a point ended by the user on the second device based on the session data in an updated copy of the local application.

6. The information handling system of claim 1 wherein the identification request is broadcast from the second information handling system when a user is authenticated for the local application on the second information handling system and the remote service.

7. A method comprising:
    receiving, at a first device, first authentication information for a local application and a remote service from a second device via a short-range communication;
    receiving a copy of the local application, wherein the copy of the local application includes session data from a secure session between the local application and the remote service, and keys used to encrypt and decrypt information sent during the secure session;
    authenticating, at the first device, a user for the copy of the local application and for the remote service prior to the user logging on to the first device based on the first authentication information;
    authenticating the user to the first device based on second authentication information received from the user; and
    automatically initiating a secure session between the copy of the local application and the remote service when the user is authenticated to the first device.

8. The method of claim 7 further comprising:
    sending, from the first device, identification information to the second device in response to an identification request broadcast from the second device via the short-range communication.

9. The method of claim 7 further comprising:
    detecting a third device with a second short-range communication of the first device when the user is authenticated to the first device;
    receiving a list of trusted devices;
    receiving identification information for the third device;
    verifying that the third device is a trusted device when the identification information for the third device is in the list of trusted devices;
    sending the authentication information for the copy of the local application and the remote service to the third device when the third device is within the second short-range communication and is verified as a trusted device; and sending, from the first device, a updated of the copy of the local application to the third device.

10. The method of claim 7 wherein the identification request is broadcast from the second device when a user is authenticated for a local application on the second device and a remote service.

11. The method of claim 7 wherein the keys are a private key and a public key associated with the local application, and a public key received from the remote service.

12. The method of claim 7 wherein the secure session is initiated at a point ended by the user on the second device based on the session data in an updated copy of the local application.

13. A method comprising:

authenticating, at a device, a user for a local application and for a remote service based on authentication information received at the device;

detecting, by the device, a nearby device when the user is authenticated for the local application and for the remote service;

receiving identification information from the nearby device;

verifying the nearby device as a trusted device in response to the identification information for the device being located in a list of trusted devices;

sending the authentication information for the local application and the remote service to the nearby device in response to the nearby device being verified, wherein the nearby device uses the authentication information for the local application and the remote service to pre-authenticate the nearby device for the local application and the remote service prior to the user accessing the nearby device; and initiating a secure session between the local application and the remote service.

14. The method of claim 13 further comprising:

creating a list of trusted devices for a user prior to when the user is authenticated for the local application and the remote service.

15. The method of claim 13 wherein the nearby device is within a short-range communication of the device.

16. The method of claim 15 wherein the short-range communication is selected from a group consisting of a blue tooth communication and a near field communication.

17. The method of claim 13 wherein the identification information is service set identification.

18. The method of claim 13 wherein the list of trusted devices is stored in a cloud of services associated with the remote service.

19. The method of claim 13 wherein the update includes session data from the secure session, keys used to encrypt and decrypt information sent during the secure session.

20. The method of claim 13 wherein the keys are a private key and a public key associated with the local application, and a public key received from the remote service.

* * * * *